United States Patent
Boss et al.

(10) Patent No.: US 7,716,298 B2
(45) Date of Patent: *May 11, 2010

(54) LOCATION MESSAGING SYSTEM AND METHOD FOR DELIVERING MESSAGES IN A GLOBAL VIRTUAL SPACE

(75) Inventors: Gregory J. Boss, American Fork, UT (US); Kevin C. McConnell, Austin, TX (US)

(73) Assignee: International Bsuiness Machines Corporation, Armonk, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 12/031,348

(22) Filed: Feb. 14, 2008

(65) Prior Publication Data
US 2008/0133685 A1 Jun. 5, 2008

Related U.S. Application Data

(63) Continuation of application No. 10/313,731, filed on Dec. 6, 2002, now Pat. No. 7,373,383.

(51) Int. Cl.
*G06F 15/16* (2006.01)

(52) U.S. Cl. .................. 709/206; 709/204; 709/220; 709/226; 707/10; 455/566

(58) Field of Classification Search ............... 709/206, 709/219, 220, 224, 226; 455/566; 707/502
See application file for complete search history.

(56) References Cited

U.S. PATENT DOCUMENTS

| 6,155,840 | A | 12/2000 | Sallette |
| 6,256,740 | B1 * | 7/2001 | Muller et al. ............ 726/12 |
| 6,594,698 | B1 * | 7/2003 | Chow et al. ............ 709/226 |
| 6,701,378 | B1 | 3/2004 | Gilhuly et al. |
| 6,711,632 | B1 * | 3/2004 | Chow et al. ............ 710/29 |
| 7,373,383 | B2 * | 5/2008 | Boss et al. ............ 709/206 |
| 2002/0120696 | A1 | 8/2002 | Mousseau et al. |
| 2003/0026268 | A1 * | 2/2003 | Navas .................. 370/400 |
| 2003/0101284 | A1 | 5/2003 | Cabrera et al. |
| 2003/0156141 | A1 | 8/2003 | Good et al. |
| 2003/0174178 | A1 | 9/2003 | Hodges |

* cited by examiner

*Primary Examiner*—Khanh Q Dinh
(74) *Attorney, Agent, or Firm*—Cahn & Samuels LLP

(57) ABSTRACT

A location messaging system creates and delivers messages in a global virtual space, at the best time and location, in the optimal context. The recipient can be either generally or specifically targeted. The location message criteria can be formatted so that only a specific group of people see the message. Location messaging leaves "triggers" in a virtual location that can be either action or time related. Using action triggers, the location message will not be delivered until the recipient performs the predetermined action. That action includes things like visiting a web page/site, opening or editing a document, scanning a badge through a badge reader, buying a product from a store, or combining physical aspects to these virtual actions. Using time triggers, the location message has the ability to increase or decrease delivery or importance levels automatically. The location message will not be displayed or delivered to the recipient until that individual activates the message; messages are activated by performing some action predetermined by the message sender or a sender specified time duration has elapsed. Location messages have physical attributes associated with them. This allows a sender to leave a message for a recipient that is displayed only when he accesses a specific document from a specific place.

25 Claims, 3 Drawing Sheets

Figure 1:
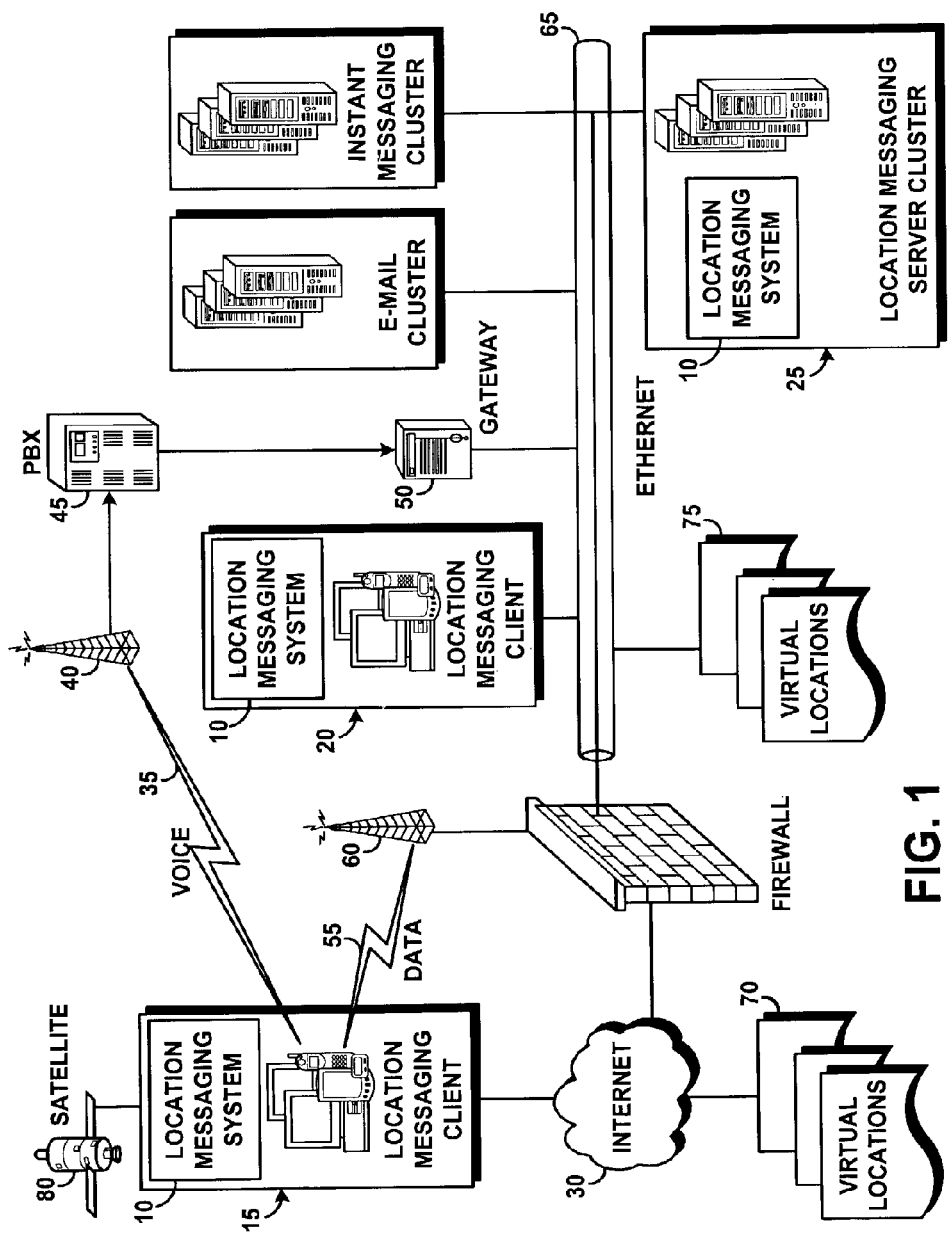

LOCATION MESSAGING SYSTEM AND METHOD FOR DELIVERING MESSAGES IN A GLOBAL VIRTUAL SPACE

This patent application is a continuation application of U.S. patent application Ser. No. 10/313,731 filed on Dec. 6, 2002, which is hereby incorporated by reference.

I. FIELD OF THE INVENTION

The present invention relates to a computer system, and more particularly to a method, system, and computer program product for enabling messaging systems to leave messages in any virtual location and to deliver messages in an optimum context with virtual and physical aspects. The present invention comprises a system that could be implemented as an extension of the capabilities of instant messaging or email, or as an independent messaging system.

II. BACKGROUND OF THE INVENTION

Currently, the two most prevalent electronic communication formats are instant messaging and e-mail. Instant messaging systems provide real-time communication between users who are connected to the systems through an on-line or electronic networking environment. Instant messaging systems are quite popular among Internet, Intranet, and Extranet users because they are user friendly and provide a simple, inexpensive way to send instantaneous messages. However, the popularity of instant messaging has created an interrupt-driven workforce. Employees turn off instant messaging to get work accomplished; this reduces the effectiveness of a virtual knowledge organization because experts, co-workers, or friends may not be readily available.

Many times instant messaging is misused because no better message format appears to be available for the sender. Instant messaging has a high level of urgency implied in its delivery format, similar to a telephone call, and encourages an immediate response.

Conversely, e-mail has a relatively lower level of urgency, similar to postal mail. The recipient can read an e-mail whenever they have time and may delay responding to an e-mail for significant periods of time, for example from several minutes to several days. Messages that do not require immediate action are often sent via instant messaging rather than e-mail because the senders wish to engage in a very interactive conversation or they do not wish a reply to be delayed beyond a certain time frame. If a follow-on message is dependent upon the reply to a previous message, the delay in having that conversation over email could be days, depending on the number of interchanges.

There exists a class of messages that falls between instant messaging and e-mail in urgency. These communication messages do not require immediate delivery, interrupting the employee or other individual. However, these messages do need a response when they are received; delivery at the right time in the right context or place can maximize their effectiveness. The combination of location, activity and timing in the delivery of messages creates a messaging class that is contextual. The vast majority of instant messages or e-mail are not contextual in nature.

One instant messaging and web conferencing solution has a feature called "place based awareness" that allows a user to know when another user is currently in the same "virtual location." This feature allows the users in that same location the opportunity to collaborate on a common topic; the topic is typically contextual to the virtual location. However, this technology requires that the group of users be in the same virtual location at the same time. The "place based awareness" message is therefore always synchronous. In addition, the senders will not know in advance to whom they will be able to send the message.

Using place based awareness, if a user wishes to visit a web site and interact with others at that web site, the user must go to that web site and stay connected there until someone else accesses that web site. If five people access that web site, the user must decide whether to send five independent messages, one to each person, asking for some contextual input.

What is therefore needed is a system and associated method for leaving messages for others on the virtual global computing space that can be delivered to the recipient at the appropriate time and to the appropriate place that ultimately provides a much richer contextual messaging environment. The need for such a system has heretofore remained unsatisfied.

III. SUMMARY OF THE INVENTION

The present invention satisfies this need, and presents a location messaging system, a computer program product, and an associated method (collectively referred to herein as the system" or "the present system") for delivering messages in the global virtual space. The present system delivers a message at the best time and location, in the optimal context.

In addition, the present system allows the message sender and recipient to be in the same place at different times, it allows both synchronous and asynchronous communications. In a novel aspect of the present system, the recipient can be either generally or specifically targeted. The location message criteria can be formatted so that only a specific group of people see the message; for example, those with a particular skill level within a particular company, those who are members of a particular discussion group on the internet, etc. These criteria can be derived from public or private directories or inferred by data-mining or other programmatic methods.

This message will not be displayed or delivered to the recipient until the recipient or the recipient's action, inaction, or presence activates the message. Messages are activated, for example, by performing an action that is predetermined by the message sender or by combining elements of time.

The location message of the present system can contain any type of computing media such as text, voice, video, etc. Location messages can also have physical attributes associated with them. These physical attributes are identified from a network card's MAC address, TCP/IP address, GPS location, cell tower information, or other means. This allows a sender to leave a message for a recipient that is displayed only when the recipient activates the action or time trigger from a specific place.

The present location messaging system can be thought of as filling a gap between asynchronous e-mail and synchronous instant messaging. Messages that do not require an immediate response or high degree of interactivity should not require the use of instant messaging. However, there is a lesser degree of urgency and contextual elements that e-mails do not accommodate properly. The relation to email and instant messaging are given only as examples, and in the proper context location messaging it can be applied to any messaging format including voice, SMS, IM, email, voice-mail, MMS, and other formats not explicitly named.

The present location messaging system enables a method of communication with location messages that have a built-in contextual attribute. The location message accounts for the recipient's location or context, at the time the recipient views, displays, or otherwise activates the location message.

In another aspect of the present system, the location message can be formatted with an auto response feature. The auto response can be of any format including but not limited to another location message, an e-mail, instant message, SMS, voice, or a combination thereof.

The use of the present location messaging system can reduce the amount of instant messaging that interrupts workers and promote collaboration between employees. Location messaging is contextual in that the message is related to what the recipient is working on or doing at the moment the message is received. Contextual collaboration is promoted through the receipt of the message when appropriate to the recipient's task flow rather than the sender's task flow. Contextual collaboration is the relation between the location of the recipient of the message, what the recipient of the message is doing, and the content of the message.

The present location messaging system optionally assigns "triggers" to the location message. The trigger can be either action or time related. The action trigger displays the message when an action defined by the sender takes place. The message sender uses an action trigger when the sender wants the recipient to receive the message after the recipient performs a specific action. For exemplification purpose only, such actions might be clicking on a web site, opening a document or particular portion of a document, editing a document, moving the mouse over a picture, copying a document, saving a document, moving a document, making a purchase, or entering a store and initiating a transaction. The recipient does not see the message until the recipient performs the action defined by the sender. The action trigger associates a context with the message, delivering it at the appropriate time and place.

The time trigger activates on an elapsed time frame defined by the sender. If the recipient does not view the location message in a specified amount of time, the location message has the ability to perform certain actions. One such action might be to send an e-mail to the recipient. Another time trigger could send an instant message if the e-mail is not read within a specified amount of time. Other time triggers could involve pager notifications, automated voice calls, or scripted actions. Using time triggers, the location message has the ability to increase or decrease delivery or importance levels automatically. Not only can a location message trigger other types of messages, it can be transformed into another type of message itself.

IV. BRIEF DESCRIPTION OF THE DRAWINGS

Figure 2A:
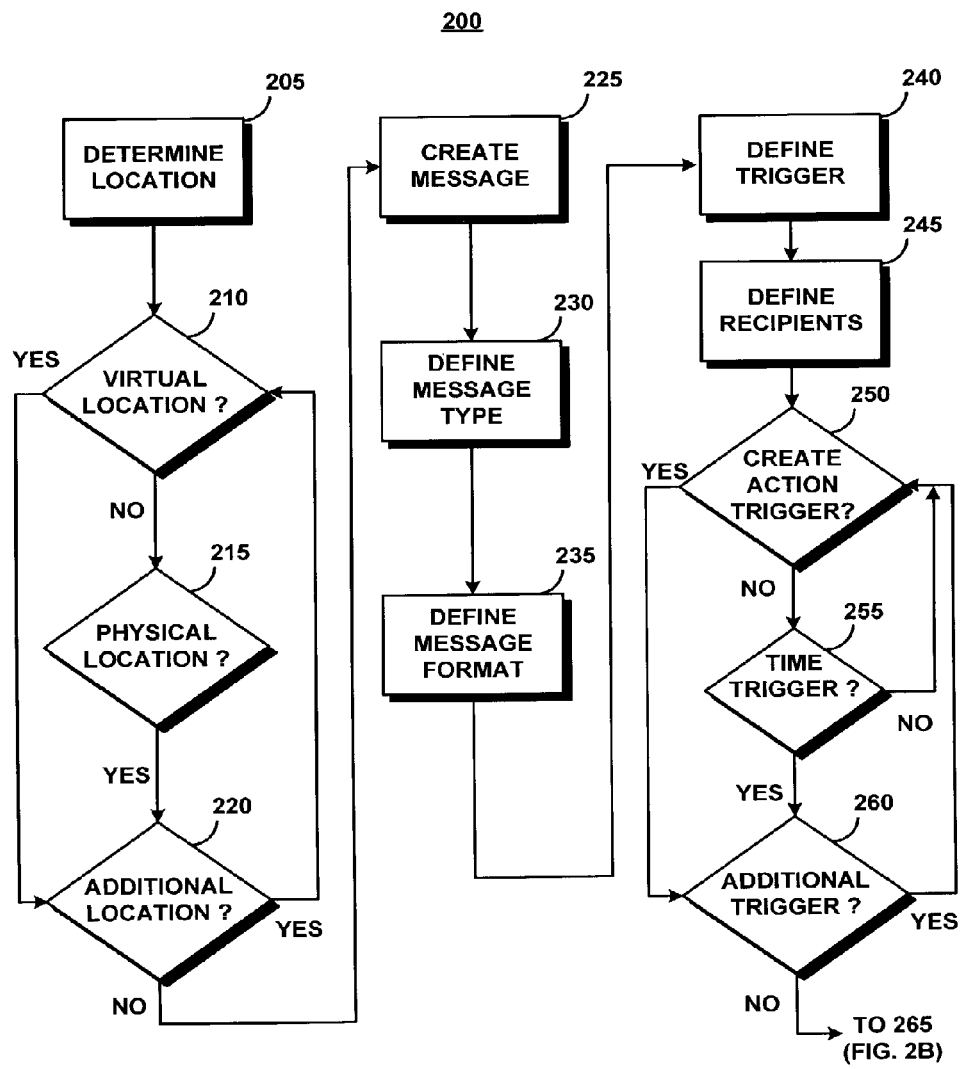
Figure 2B:
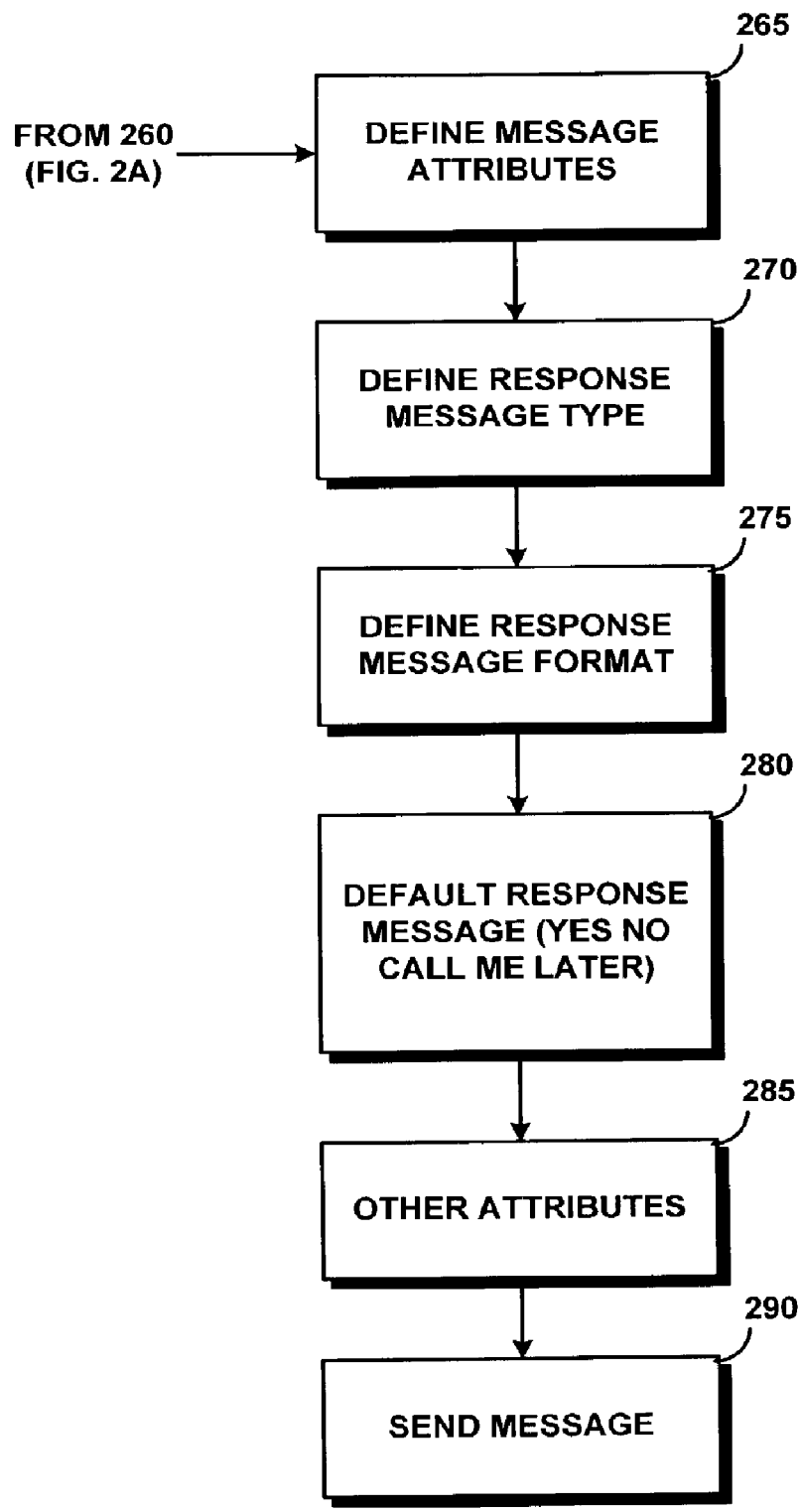

The various features of the present invention and the manner of attaining them will be described in greater detail with reference to the following description, claims, and drawings, wherein reference numerals are reused, where appropriate, to indicate a correspondence between the referenced items, and wherein:

FIG. 1 is a schematic illustration of an exemplary operating environment in which a location messaging system and method for delivering messages in a global virtual space of the present invention can be used; and FIG. 2 is comprised of FIGS. 2A and 2B, and represents a process flow chart illustrating a method of operation of the location messaging system of FIG. 1.

V. DETAILED DESCRIPTION OF PREFERRED EMBODIMENTS

The following definitions and explanations provide background information pertaining to the technical field of the present invention, and are intended to facilitate the understanding of the present invention without limiting its scope:

Asynchronous: Refers to events that are not synchronized, or coordinated, in time. Location messaging is initially asynchronous but can become synchronous with an appropriate time trigger.

E-mail (electronic-mail): The transmission of memos and messages over a network. Within an enterprise, users can send mail to a single recipient or broadcast it to multiple users. Mail is sent to a simulated mailbox in the network mail server or host computer until it is interrogated and deleted.

GPS (Global Positioning System): A satellite-based radio navigation system run by the U.S. Department of Defense.

Instant Messaging: A computer conference using the keyboard (a keyboard chat) over the Internet between two or more people. Instant messaging (IM) is not a dial-up system like the telephone; it requires that both parties be on-line at the same time.

Internet: A collection of interconnected public and private computer networks that are linked together with routers by a set of standards protocols to form a global, distributed network.

MMS (Multimedia Messaging Service): Provides the ability to exchange not only text, but also pictures, audio, animations and video via a mobile phone. It is a more robust version of EMS (Enhanced Messaging Service) which provides ring tones and basic images.

PDA: (Personal Digital Assistant) A handheld computer that serves as an organizer for personal information. It generally includes at least a name and address database, to-do list and note taker. PDAs can use a stylus or thumb keyboard for input to select menu items and to enter printed characters. The unit may also include a small on-screen keyboard which is tapped with the pen. Data are synchronized between the PDA and desktop computer via cable or wireless transmission.

MAC (Media Access Control) Address: The physical address of a device connected to a network, expressed as a 48-bit hexadecimal number.

Physical Location: Any site that can be derived from satellites, cellular triangulation, and other means. These sites include IP addresses, MAC addresses, GPS coordinates, zip codes, cities, states, etc.

SMS (Short Messaging System or Short Message Service): A feature that allows users to receive or transmit short text messages using a wireless phone. Using SMS, a short alphanumeric message up to 160 characters can be transmitted to a mobile phone that displays the message as a pager would.

Synchronous: Occurring at the same time and/or same place. Instant messaging is synchronous.

TCP/IP: (Transmission Control Protocol/Internet Protocol) A communications protocol to inter-network dissimilar systems.

Virtual Location: Any location that can be accessed online, both on the Internet and Intranet, including web sites, web pages, documents, pages, paragraphs, words, characters, etc. A document saved to a network drive also has a virtual location.

FIG. 1 portrays an exemplary overall environment in which a location messaging system 10 and associated method for delivering messages in the global virtual space according to the present invention may be used. System 10 includes a software programming code or computer program product that is typically embedded within, or installed on a computer, workstation, laptop, PDA or other wireless handheld device, cell phones, etc., as represented by location messaging clients 15, 20. Location messaging client 15 is represented as a wireless device, while location messaging client 20 is represented as a computer, workstation, etc.

System 10 can function as a source for location messages without being installed on the recipient's computer or other device. The function performed by system 10 can also be implemented in a server-side system such as location messaging server cluster 25. System 10 can also be added to any instant messaging application to extend the instant messaging application's function to include location messaging, or alternatively, system 10 can be implemented separately. System 10 can be saved on a suitable storage medium such as a diskette, a CD, a hard drive, or like devices.

The location messaging client 15 communicates with other computers or networks of computers through various paths: the Internet 30; wireless communication as represented by voice transmission 35 through antenna 40, PBX 45, and gateway 50; or data transmission 55 through antenna 60 and the Internet 30 or Ethernet 65. The location messaging client 20 may also be associated with such other computers in a Local Area Network (LAN) or a Wide Area Network (WAN) through Ethernet 65.

System 10 implemented on location messaging client 20 can leave a location message for location messaging client 15 in either virtual locations 70, 75, in a physical location, or a combination of the two. Virtual locations are any virtual place a user can visit on-line. Any document saved to a drive (such as a network drive) can also be visited on-line and can be considered as a virtual location. Virtual locations can also include physical locations, or a combination of virtual and physical locations, such as a computer connected to the Internet.

Location messaging client 15 can be physically located by satellite 80 using global positioning or triangulation using antennas 40 and 60. System 10 implemented on location messaging client 15 can also leave a location message for location messaging client 20 in virtual locations 70, 75.

Location messaging client 20 can be physically located for example by its IP address or MAC address. The medium used to deliver the location message can take the form of e-mail, instant message, SMS, voice, location message, or combination of the above.

The message type is stored within the message. The message originates at, for example either location messaging client 15 or 20 using system 10, and gets deposited at location message server cluster 25. The message can remain at location message server cluster 25 until the recipient or recipients are available to receive the message over the specified medium. Depending on the availability of the recipient the message may stay on cluster 25 or be delivered to the recipients local system 10 where it will be hidden from the user until the message triggers are activated. The message format includes elements of rich text, radio buttons, check boxes, drop down lists, and predetermined responses.

A method of operation 200 of system 10 is illustrated by the process flow chart of FIG. 2 (FIGS. 2A, 2B). Creating a location message generally comprises the following four operational phases:

1. Determine the destination location of the message;
2. create the message;
3. define the trigger; and
4. define the location message attributes.

To create the location message, system 10 could allow the message originator, for example, to go to the web site or document where the message is to be placed, "right click" on the mouse, and choose "leave message". Alternatively, system 10 can provide a client/application on the desktop that the message originator uses to create the location message.

Destination locations can be virtual, physical, or a combination thereof. Virtual locations include web sites, web pages, documents, pages, paragraphs, words, characters, any destination on the internet or an intranet. Physical locations include IP addresses, MAC addresses, GPS coordinates, geographic locations determined through cellular triangulation, zip codes, cities, states, etc.

To determine the destination location of the message (block 205 of FIG. 2A) in phase one, system 10 first ascertains whether the message is intended for a virtual location at decision block 210. If not, system 10 checks whether the message originator wishes to send the message to a physical location at decision block 215.

If at block 215 system 10 determines that the message originator does not wish to send the message to a physical location, system 10 returns to decision block 210. The message originator chooses either a physical, virtual location, or a combination thereof. If at decision block 215 the message originator chooses a physical location, system 10 proceeds to decision block 220 and asks the message originator if there are any other destination locations desired for this message. If yes, system 10 returns to decision block 210.

If the destination at decision block 210 is a virtual location, system 10 again asks at decision block 220 if additional locations are desired, repeating blocks 210, 215, and 220 until all destination locations for the message have been selected.

The location message is created in phase 2 at block 225 through whatever means are provided by the software installed on the location messaging client 15. The message originator selects the message type at block 230. The message type can be an e-mail, instant message, SMS, voice, location message, or combination of these. At block 235, the message originator selects the message format. The message format describes the message's appearance, using elements such as rich text, radio buttons, check boxes, drop down lists, and predetermined responses.

Activation triggers are defined in phase 3 at block 240. The trigger determines what action must take place before the message is displayed to the recipient. The trigger can involve an action, time, or both. The message originator selects the target message recipient at block 245. The message recipient can be an individual, a group of individuals, or a definition of matching characteristics that can be compared dynamically.

In a distinctive aspect of the system 10, the recipient can also be a profile of possible recipients. For example, the message originator may specify that all users visiting the company's internal web site that have a skill level of 5 (expert or above with advanced skills) should receive the message. The message gets sent once and is delivered to the correct people in the preferred context.

System 10 then asks the message originator whether the location message will have an action trigger at decision block 250. An action trigger describes an action the recipient must take to cause message delivery. Actions used as triggers include visiting a virtual or physical location, editing elements of a document, sending a message, launching a program, etc. Action triggers can also require a combination of actions by the message recipient to receive the message. If the message originator does not wish to use an action trigger, system 10 asks at decision block 255 whether the message originator whishes to include a time trigger.

A time trigger is created by specifying a time duration during which the location message is active. If the message originator does not wish to select a time trigger, system 10 returns to decision block 250. Some form of trigger must be selected by the message originator. If the message originator selects a time trigger at decision block 255, system 10 proceeds to decision block 260.

At decision block 260, system 10 inquires whether the message originator wishes to use an additional trigger. If yes, system 10 returns to decision block 250. If the message originator wishes to create an action trigger at decision block 250, system 10 continues on to decision block 260. Blocks 250, 255, and 260 are repeated until all the triggers have been defined for the location message.

System 10 defines message attributes in phase 4, at block 265 of FIG. 2B. Message attributes provide control and flexibility to the message originator regarding message appearance and possible responses to the message. At block 270, the message originator selects the response message type. Response message types are identical to message types: e-mail, instant message, SMS, voice, location message, or combination of these.

The message originator defines the response message format at block 275 using format elements such as rich text, radio buttons, check boxes, drop down lists, and predetermined responses. In one aspect of system 10, the message originator specifies a default response for the message at block 280; the recipient can choose to respond by default. A possible default message might be "Yes, No, Call me later" and can be returned to the message originator as e-mail, instant message, SMS, voice, location message, or combination of these.

Other attributes are added to the message at block 285. The attributes determine how the message is displayed, how the response is delivered, and the escalation of messages and message priorities if the recipient does not activate the message. For example, the message originator sends a location message to John to be activated when he enters a particular document within a specified time period, 24 hours. If John does not access that document within the specified time frame, system 10 sends a different type of message, as defined by the message originator. The new message might be an e-mail. If that e-mail isn't read within an allotted time, system 10 sends an instant message to John. This progression of messages with escalating priorities is defined at block 285.

At block 290, system 10 sends the message to storage for delivery at a time determined by the action trigger or the time trigger. The message can be stored on the recipient's location messaging client 15, 20, on the location messaging server cluster 25, on the virtual location server or any other location. System 10 of the recipient's location messaging client will not display the message until the action trigger or time trigger criteria are met. The recipient can choose to view all of his location messages manually, overriding the trigger mechanisms. In this case, clicking on one of the messages might then activate the virtual location, taking the recipient to the related document, web site, web page, etc.

System 10 can implement a security procedure so that the location message can authenticate the recipient against the trigger criteria. An authentication process for a location message would be able to look up users/groups in a directory or an imbedded list of authorized recipients within the message itself. System 10 could also have a mechanism for recording the state of the message so that the message would be delivered the correct number of times to the correct people and in the right order.

Location messaging can assume numerous forms. For example, John, Matt, and Tim are all working on project A, a white paper that includes several deliverables. Project A is one of many projects that John, Matt, and Tim are assigned and represents a few hours of work per day. Matt is working on project A and finds a key component of the project missing from deliverable 3; John is responsible for this deliverable. However, John is currently working on project B and does not wish to be disturbed. If Matt sends an instant message, it will become a distraction to John. If Matt sends an e-mail, John may not read it until tomorrow. Matt prefers that John receive the message when the message applies, which is when John is reviewing deliverable 3 from project A. Matt inserts a location message into deliverable 3 of project A. Later in the day John begins work on project A and accesses deliverable 3. The location message from Matt appears on John's screen describing the missing part and requesting that John notify Matt upon receipt. John then responds with an instant message to Matt.

John could extend the action of the location message to Matt by including in his location message a time attribute. If John doesn't view deliverable 3 of project A within 12 hours, then system 10 delivers the location message via e-mail. If the location message is not read within 24 hours, then system 10 delivers an instant message notifying John of an urgent message on project A deliverable 3.

In another example of location messaging, John and Marie had been working remotely on a project they completed. John and Marie never met, but agreed to have lunch the next time either of them is in town. Marie leaves a location message for John with a one-year time limit and an activation trigger. The activation trigger causes system 10 to send an SMS message to John's cell phone the next time his cell phone associates with a cell tower in Marie's home town of Atlanta and Marie's calendar shows she is not on vacation. Six months later, John travels to Atlanta on business. As soon as he gets off the plane and turns on his cell phone, he receives an SMS message from Marie indicating that she is in town and would like to schedule lunch.

In a third example of location messaging, John is at the local coffee shop and scans his credit card at the cashier's station. This action activates a location message left two weeks earlier by his coworker Tim with the activation trigger of "any visit within four months to a branch of this chain of coffee shops in the 48603 zip code". The message displays on the cashier's terminal, reading: "John, try the Moca Moca; I highly recommend it—Tim". Since John trusts Tim, he purchases the recommended beverage. The original location message requested a response from system 10 whether the beverage was purchased. Since John purchased the beverage, system 10 initiates an instant message to Tim, which he receives on his cell phone. Tim proceeds to call John and ask if he liked the new beverage.

Location messaging can be used in targeted advertising for e-commerce applications. Some e-commerce web sites have a feature that displays during the check-out process messages containing information about additional products the shopper might be interested in purchasing. The suggestions in these messages are usually created by a rules engine and are typically based on similar products others have purchased or on targeted advertisements from third party businesses. The check-out message can only be left at one place, the checkout chart, and the message is generated using data mining. Location messaging would allow the e-business to ask questions, solicit feedback, and engage in conversations with the shopper as the shopper navigates the e-commerce website, creating an interaction between the e-business and the shopper similar to the shopping experience in a physical store.

Another location messaging application is in newsgroups and discussion boards. Newsgroups are commonly used to collaborate on isolated topics. Participants in newsgroups understand that most of the dialog is contextual in nature; the discussions occur among those people currently logged onto the newsgroup in one virtual location. Location messaging allows the same contextual interaction to occur in any virtual location. In addition, location messaging allows a user to leave a message for everyone who visits the newsgroup, essentially creating a public e-mail in-box for the newsgroup or discussion board.

Location messaging can be used in mobile phone applications based on physical location. One example of such an application is a game that determines your location from cell tower triangulation or global positioning satellites and alerts the participant when an opponent is in close proximity. The alert is a system-generated message based on a rules engine. Using location messaging, the game participants can leave individualized messages for specific opponents rather than generalized system messages provided by the rules engine. Further, the opponent or sending party could determine what type of response to leave and place an expiration on the message.

It is to be understood that the specific embodiments of the invention that have been described are merely illustrative of certain application of the principle of the present invention. Numerous modifications may be made to the location messaging system and method for delivering messages in the global virtual space invention described herein without departing from the spirit and scope of the present invention.

Location messaging could be implemented using standards, i.e., XML based, which would allow any document format to contain the meta data needed for location messaging. This meta data would include the action triggers, time triggers, message format, response formats, etc. Location messaging could also be implemented by extending the current capabilities of an instant messaging (IM) client. In the later case the location message would not have any data elements stored in the actual document or virtual location but would keep the entire message within system 10 (FIG. 1) on the client or server. In either case the perception to the user is the same; it appears that the message is delivered while in a virtual location and performing a certain action.

We claim:

1. A messaging method for delivering a location message by a location messaging system, comprising:
   creating a location message destined for delivery to a recipient in response to an activation by a recipient, by:
   determining a destination location for the location message; creating the location message;
   defining a trigger event for activation by the recipient, that causes the location message to be activated;
   defining attributes for the location message, wherein the attributes include a contextual attribute that accounts for a recipient's location and a time of activation of the location message by the recipient; and
   transmitting the location message to the destination location for storage and delayed delivery of the location message to the recipient, wherein the delayed delivery is initiated in response to the satisfaction of the contextual attribute and upon activation of the trigger event by the recipient as defined by the sender.

2. The method of claim 1, wherein determining the destination location of the location message comprises determining if the message is intended for a physical location.

3. The method of claim 2, wherein if the message is intended for a physical location, adding an address of the physical location to the location message.

4. The method of claim 1, wherein creating the location message comprises defining a message type.

5. The method of claim 4, wherein defining the message type comprises defining any one or more of: an e-mail, an instant message, a short messaging system, a voice mail, and a location message.

6. The method of claim 4, wherein creating the location message further comprises defining a message format.

7. The method of claim 1, wherein defining the trigger event comprises determining if the trigger event comprises an action trigger.

8. The method of claim 1, wherein defining the trigger event comprises determining if the trigger event comprises a time trigger.

9. The method of claim 1, wherein defining the location message attributes comprises defining a response message type.

10. The method of claim 9, wherein the response message type comprises any one or more of: an e-mail, an instant message, a short messaging system, a voice mail, and a location message.

11. The method of claim 1, wherein defining the location message attributes comprises defining a response message format.

12. The method of claim 9, further comprising changing the message type into another messaging type.

13. The method of claim 12, wherein changing the message type based on a time frame.

14. The method of claim 12, wherein changing the message type based on a predetermined action performed by a message recipient.

15. The method of claim 1, further comprising replying to the location message with a reply location message.

16. The method of claim 15, wherein replying to the location message comprises replying with a message of different type.

17. The method of claim 1, further comprising activating the location message when a recipient performs a predetermined action.

18. The method of claim 1, further comprising activating the location message when a time criterion is met.

19. A computer program product embedded in a computer readable storage medium having instruction codes for delivering a location message, comprising:
   a first set of instruction codes for creating a location message destined for delivery to a recipient in response to an activation by a recipient, by:
   determining a destination location for the location message; creating the location message;
   defining a trigger event for activation by the recipient, that causes the location message to be activated;
   defining attributes for the location message, wherein the attributes include a contextual attribute that accounts for a recipient's location and a time of activation of the location message by the recipient; and
   a second set of instruction codes for transmitting the location message to the destination location for storage and delayed delivery of the location message to the recipient, wherein the delayed delivery is initiated in response to the satisfaction of the contextual attribute and upon activation of the trigger event by the recipient as defined by a sender.

20. The computer program product of claim 19, wherein the first set of instruction codes determines if the message is intended for a virtual location; and wherein if the message is intended for a virtual location, the first set of instruction codes adds the virtual location to the location message.

21. The computer program product of claim 19, further comprising a third set of instruction codes for replying to the location message with a reply location message.

22. The computer program product of claim 19, further comprising a fourth set of instruction codes for activating the location message when any one or more of the following events transpires: a recipient performs a predetermined action, and a time criterion is met.

23. A system for delivering a location message, comprising:

means for creating a location message destined for delivery to a recipient in response to an activation by a recipient, by:

determining a destination location for the location message;

creating the location message;

defining a trigger event for activation by the recipient, that causes the location message to be activated;

defining attributes for the location message, wherein the attributes include a contextual attribute that accounts for a recipients location and a time of activation of the location message by the recipient; and means for transmitting the location message to the destination location for storage and delayed delivery of the location message to the recipient, wherein the delayed delivery is initiated in response to the satisfaction of the contextual attribute and upon activation of the trigger event by the recipient as defined by a sender.

24. The system of claim 23, wherein the creating means defines at least one of a message type, a message format, and a response message type.

25. The system of claim 23, wherein the creating means determines if the trigger event comprises a time trigger.

* * * * *